United States Patent [19]

Hickey

[11] Patent Number: 4,803,643
[45] Date of Patent: Feb. 7, 1989

[54] SYSTEM AND METHOD FOR CREATING MEMORY-RETAINED, FORMATTED PAGES OF TEXT, TABULATION, AND GRAPHIC DATA

[75] Inventor: Thomas B. Hickey, Columbus, Ohio

[73] Assignee: OCLC Online Computer Library Center Incorporated, Dublin, Ohio

[21] Appl. No.: 83,779

[22] Filed: Aug. 10, 1987

[51] Int. Cl.$^4$ ............................................. G06F 15/62
[52] U.S. Cl. ..................................... 364/523; 364/518
[58] Field of Search ................ 364/518, 523; 340/735; 382/9

[56] References Cited

U.S. PATENT DOCUMENTS

| | | | |
|---|---|---|---|
| 4,601,003 | 7/1986 | Yoneyama et al. | 364/518 |
| 4,608,664 | 8/1986 | Bartlett et al. | 364/523 X |
| 4,677,571 | 6/1987 | Riseman et al. | 364/519 |
| 4,679,153 | 7/1987 | Robinson et al. | 364/523 |
| 4,745,561 | 5/1988 | Hirosawa et al. | 364/523 |
| 4,748,678 | 5/1988 | Takeda et al. | 364/518 X |

*Primary Examiner*—A. D. Pellinen
*Assistant Examiner*—H. Williams
*Attorney, Agent, or Firm*—Mueller and Smith

[57] ABSTRACT

A system and method for treating publisher's textual and graphical data and converting it to device independent digital form for retention in master memory. Once both textual and graphical data have been converted to digital form, the graphical data are inserted in appropriate locations as determined by a formatting routine. Formatted articles then are collected for retention in master memory, and eventual production of local memory. The formatted page files residing in master memory are in a device independent form such that they are outputtable with high quality on a variety of output devices. Additionally, an index is generated for every word retained in master memory enabling the user to peruse as many as 30,000 complex pages for the desired subject matter.

45 Claims, 12 Drawing Sheets

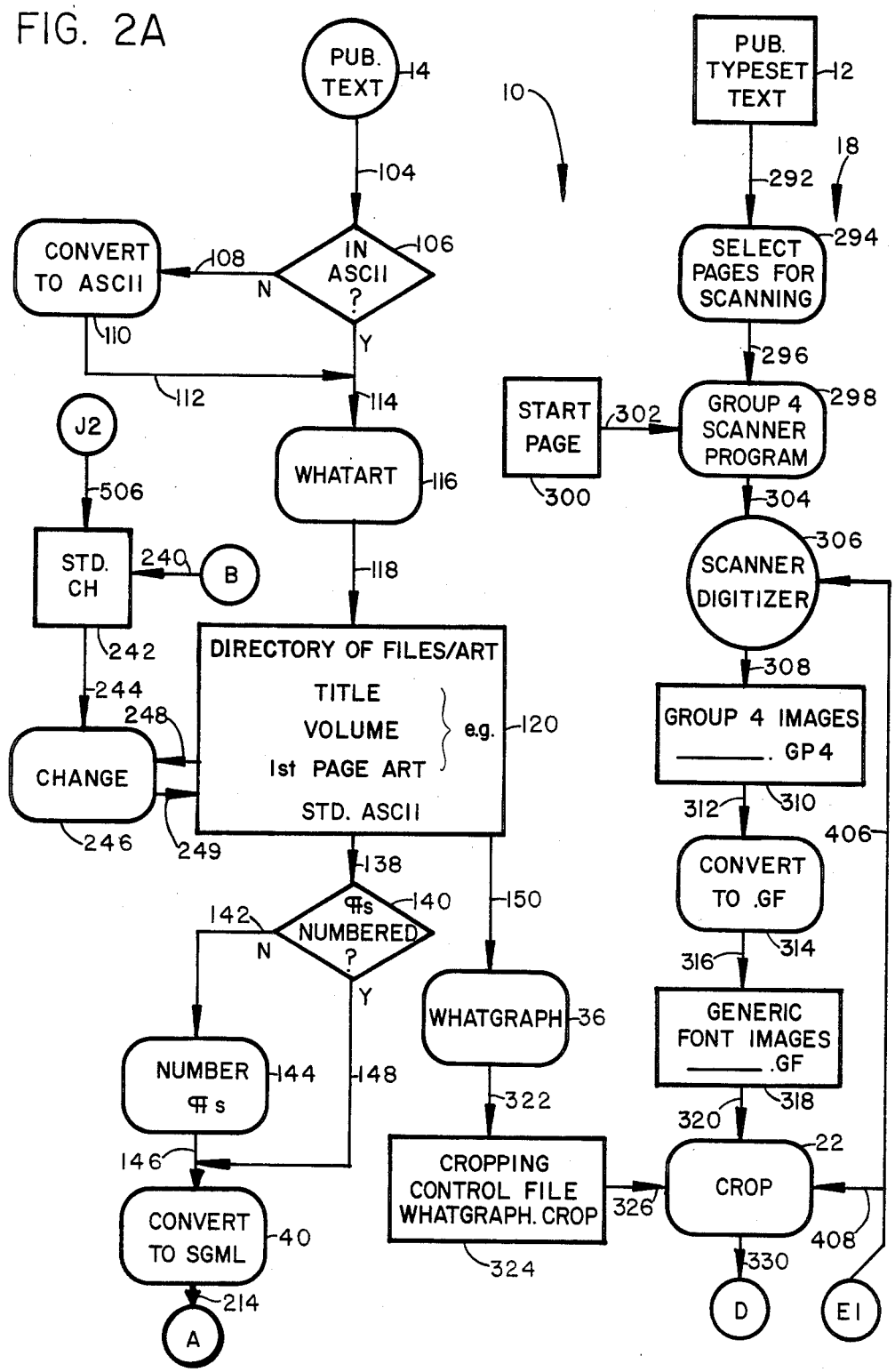

SYSTEM AND METHOD FOR CREATING MEMORY-RETAINED, FORMATTED PAGES OF TEXT, TABULATION, AND GRAPHIC DATA

BACKGROUND

As the amount of published information pertaining to science, business, reference and the like has grown, there has arisen a concomitant requirement to address the difficulties of space restraints associated with storing the great bulk of paper materials generated. Additionally, selective retrieval of documents and articles from these collections has cebome elaborate. As an example of the significance of storage requirements, a typical 10 year collection of merely one scientific journal may amount to 30,000 pages. Thus, costs to a library facility to carry out conventional binding and shelf storage of significant numbers of such publications have become expensive. To at least lessen the storage requirements, resort has been made for providing microfiche copies of the materials. However, ussers of such storage media find the approach somewhat unsatisfactory, particularly with respect to the information search and hard copy aspects.

Investigators have considered and implemented the storage of such information within the magnetic media of principal computer installations in conjunction with on-line communication with satellite or subscriber terminals provided, for example, as the ubiquitous personal computer (PC). Such systems offer advantages in terms of efficient information storage, as well as in providing searching techniques which may be interactive with the user or library patron. However, such advantages are somewhat offset by the costs of communication between host and satellite terminal, as well as the extended time factor often associated with host-to-PC interactive communication of graphical data, and the less than satisfactory visual quality of the retrieved graphical output.

Over the recent past, optical disk technology has introduced the CD ROM, a compact device capable of carrying a database, of approximately 600 megabytes of digital data. Accordingly, one such device is capable of retaining the equivalent of a decade collection of full text and graphics for a significantly sized scientific journal or the like. Further, because of the reasonable production costs involved, once a master is produced, the CD ROMs can be relatively widely distributed for interactive employment by library patrons or users in the field. High communication costs are avoided, as well as the excessive delays occasioned in accession data through communications links while providing high resolution output on a wide variety of screens and printers.

To effectively implement such high density local memory devices for retaining these reference materials, however, a practical technique or system for creating the necessary master from which they are formed is necessary. A practical commercialization of such technology requires that the output of complex typesetting systems used by publishers can be algorithmically translated into a standard format with a minimum of human intervention. Because such publications conventionally incorporate graphics, tabulations and, very often, chemical and mathematical symbols and equations practical techniques also are required for effectively combining such materials with text in a manner wherein page printouts will closely reflect the quality of the original publication. Finally, an effective indexing and searching facility is required of the master structure to permit adequate access on the part of the local user or patron of the data retained in the CD ROM in an effective and efficient interactive manner. For example, Boolean retrieval techniques, searches conducted by the occurrence of words and strings within specificed fields and paragraphs are desirable. The outputs at the local terminal must be adequately presentable both on the screen of a conventional PC monitor and through a conventional, reasonably priced printer. Thus, searching can be carried out at this local situs and full text materials can be retrieved in printed form.

SUMMARY

The present invention is addressed to a system and method for treating data carrying magnetic tape, as well as published graphics, text and illustrative materials used in forming extensive publications so they may be retained in a component storage device such as a small CD ROM. This conversion is carried out employing a technique permitting the production of these local memories at practical costs. The economy of the system and method results from limited operator intervention. In this regard, the conversion of publisher provided graphic and textual data into digital, formatted, device independent pages of master memory is almost completely automated. Once the system has been set-up for converting a particular publisher's data, the process operator's only task is to assure quality control.

As a result of the high level of practicality of the instant system and method, a small CD ROM local memory may be produced to retain, on a practical basis, substantial amounts of data. For example, the single CD ROM may contain a typical 10-year collection of a scientific journal which may amount to 30,000 complex pages. These retained data not only will include text which is reproducable on the monitors and printers of conventional personal computers, but also graphics, illustrations and tables.

Aside from being practical to produce, the local memories created by the present system and method include extensive searching capabilities and a high quality output on a variety of the noted "PC" output devices, i.e. monitors and printers. The local memory index allows the user to jump to the occurrence of any word or words of the 30,000 pages stored on the CD ROM disk. This index is created by listing all the words of every article and addressing each by field, paragraph, and sentence. In addition to the index, the user may take advantage of the table of contents generated by the present invention for each article, allowing the user at a monitor to skip to the appropriate field, heading, or sub-heading as desired. Further, the user may skip to any graphic illustration referenced in the text with a single keystroke and then may magnify this grahic illustration for careful analysis before outputting a hard copy of the article. Since the page format of the article is frozen by the present invention and not determined by the output device employed, the quality of the output obtained will not generally be affected by the user's selection of an output device. The invention provides an inexpensive solution to the storage, indexing, and output of complex reference data.

Another feature of the invention is to provide a system for converting visual illustrations on paper and associated magnetic media retained text and tabulation typesetting data of a printed publication of articles into universally outputtable digital data form retained in master memory. This system includes a graphic locator which determines the insertion location of the reference within the text and tabulation typesetting data representing the positioning of visual illustrations. A scanning arrangement is provided for converting the visual illustrations to digital graphic data and an arrangement is provided for generating graphic property data representing a graphic size characteristic data. An arrangement is made for providing font size data for the text characters represented by the text typesetting data as well as for providing font image defining data. A formatting arrangement then is provided which is responsive to the insertion locations, the text typesetting data, the graphic property data and the font size data for generating the device independent formatted page files. Finally, a mastering arrangement is provided which is responsive to the digital graphic data, the device independent formatted page files and the font image defining data for deriving the universally printable data retained within the master memory.

Another feature of the invention provides a method for converting graphic illustrations on paper and associated magnetic media retained text typesetting data from which has been derived a printed assemblage of articles into device independent digital data form retained in master memory which comprises the steps of identifying the insertion locations within the magnetic media retained text typesetting data for each graphic illustration and generating a corresponding whatgraph file. Each graphic illustration is scanned and there is derived digital graphic data corresponding therewith and there is generated graphic property data representing the graphic size characteristics of the digital graphic data. Font size data are provided and font image defining data are provided whereupon a formatting is carried out of the text typesetting data, the whatgraph file, the graphic property data, and the font size data to provide device independent formatted page files. These device independent formatted page files are combined along with the font image defining data and the digital graphic data in magnetic media for retention in the master memory.

Another feature of the invention is to provide a method for treating the graphic illustration on paper and associated computer storage media retained text and tabulation typesetting data from which has been derived a printed assemblage of articles to provide corresponding device independent digital data for retention in master memory. This method includes the steps of identifying the insertion locations within the magnetic media retained text typesetting data for each graphic illustration and generating a corresponding whatgraph file. The method further includes the step of scanning each graphic illustration and deriving digital graphic data corresponding therewith as well as the step of generating graphic property data representing the graphic size characterisitc of the digital graphic data. The tabulation typesetting data and font size data are formatted to provide device independent formatted tablution files and there is generated a tabulation video image from the device independent formatted tabulation files. The method further includes the step of applying corrections to the directory of files in the event of a defect represented in the tabulation digital image from the step of formatting the text typesetting data, the device independent formatted tabulation files, the whatgraph file, the graphic property data and font size data to provide device independent formatted page file. The device independent formatted page files, the font imaging data and the digital graphic data are combined in magnetic media for retention in master memory.

Another feature of the invention provides a method for converting graphic illustrations retained in an associated storage media, and text typesetting data retained in an associated storage media into device independent digital form retained in master memory. Steps in the method include identifying the insertion locations within the media retained text typesetting data for each graphic illustration and generating a corresponding whatgraph file. Property data representing size characteristics also is generated for each graphic illustration from analysis of the graphic illustration media. Following the provision of font size data, formatting of the text typesetting data, whatgraph file, the graphic property data, and the font size data provides device independent formatted page files. These device independent formatted page files are combined along with the provided font image defining data and graphic illustration data for retention in master memory.

Other objects of the invention will, in part, be obvious and will, in part, appear hereinafter.

The invention, accordingly, comprises the system and method possessing the construction, combination of elements, and arrangements of parts which are exemplified in the following description.

For a fuller understanding of the nature and objects of the invention, reference should be had to the following detailed description taken in connection with the accompanying drawings.

BRIEF DESCRIPTION OF THE DRAWINGS

FIGS. 2A-2D combine to provide a detailed flow diagram of the invention;

DETAILED DESCRIPTION

The instant system and process develops master tapes suitable for creating conveniently sized local memory such as CD ROMs essentially from two products generated by a publisher, to wit, the paper text produced by the publisher and the publisher production tapes used in typesetting the textual material. While all textual and graphic data of the original work are retained, a printout generated of any given article or the like, while resembling the original material, will be a unique recreation thereof which has been improved with the addition of comprehensive indexing data to facilitate user searches. The process permits the production of these master tapes with necessary human intervention, but at a level remaining practical to an extent permitting reasonably priced wider dissemination of the resultant CD ROMs or similar local memories.

Figure 1:
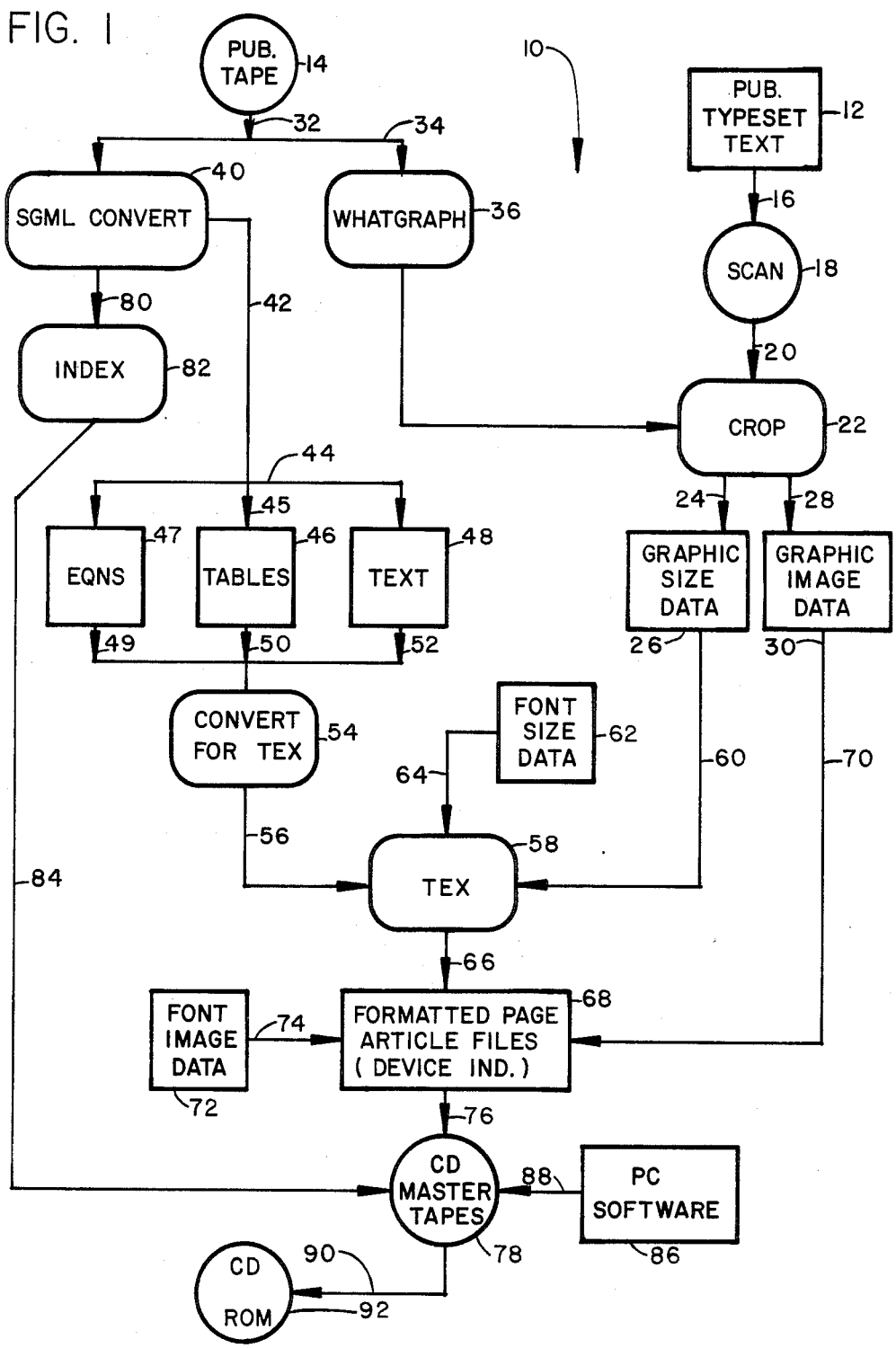
FIG. 1 is a broad flow diagram of the system and method of the invention.

Referring to FIG. 1, the process and system of the invention are revealed in general fashion at 10. The chart 10 shows the typeset pages made available from the publisher at block 12 and the magnetic media such as tapes carrying the text data employed for typesetting purposes by the publisher at symbol 14. These materials as provided on tape will vary in data architecture from publisher to publisher and thus initial treatment often is necessary due to a lack of standardization. Looking, however, to the typeset pages made available as represented at block 12, as shown at line 16, the paper text carrying graphics and some tabular material which may not be available in magnetic media is SCANned as represented at a station represented by circle 18. Generally, such SCANning will involve only those sheets of paper material carrying such graphics and may, for example, be carried out by a CCITT Group 4 standard type device. The resultant digitized information now present in magnetic media is then directed as represented at line 20 to the display of a computer terminal represented at operational symbol 22. At this station, the operator "CROPs" each graphics image or the like not otherwise available in the data from tape 14. This procedure generally will define the properties of each graphics item, for example, the size of the item and, where appropriate, the rotation. As a result of the activity at station 22, as represented at line 24 and block 26, data in magnetic medium representing the noted size os each graphics element has been developed. Similarly, as represented at line 28 and block 30 the image data representing the graphics material as developed by the Group 4 device are present in magnetic media.

Returning to the publisher's magnetic data as described at symbol 14, as represented at lines 32 and 34 leading to the operation represented at symbol 36, a determination by supporting computer program is made as to where graphics materials are intended to be located as represented in the publisher's typesetting tapes. Generally, these tapes will not contain any graphics data but will contain some indicia as to the appropriate location for such graphics. Accordingly, the "WHAT-GRAPH" program 36 is carried out, and as represented at line 38, these data so developed are made available to reference the location of the graphics for use by the activity as represented at CROPping symbol 22. Thus, a cross-referencing between the two inputs to the system occurs at this juncture.

Line 34 also is seen to be directed to a computer activity as represented at symbol 40 wherein the data available in magnetic media from the publisher are converted to a Standardized General Mark-up Language (SGML). This conversion is to a format representing a current standard in the publishing industry for carrying out character, paragraph, reference, heading, subtitle, and the like definition. Inasmuch as the instant system is one wherein, for example, as many as 10 years worth of a scientific journal may be complied upon a single CD ROM, the data retained in magnetic tape will not always have been developed in accordance with such standards. The SGML data which are developed will not only carry data corresponding with the text of any given article but also will retain corresponding information defining all those tables and the like which formed a portion of the initial data or information carried by the publishers typesetting tapes 14.

Because the data developed from the SGML activites as represented at symbol 40 will contain both text data as well as, where available, data defining tables and equations, these data elements will be treated separately. In this regard by retaining a capability for developing table and equation data without resort to scanning procedures as represented at symbol 18, a substantial savings in memory requirements is realized. Accordingly, as represented at lines 42, 45, and 44 the equational, tabular, and textual data are seen to be separated into discrete magnetic files as represented, respectively, at blocks 47, 46, and 48.

Because the ultimate memory retained materials are intended for a somewhat universal application or are constituted as "device independent" (DVI), a well accepted formatting program is employed with the instant system and method referred to a "TeX." This program, for example, is described in detail in a volume entitled "The TeXbook" by D. E. Knuth of Stanford University, published by Addison-Wesley Publishing Company, Reading, Massachusetts. To employ this particular formatting program, it then becomes necessary to convert the SGML developed data as represented at blocks 47, 46, and 48 to a format acceptable for employment in the noted TeX program. This procedure is represented at lines 49, 50, and 52 emanating, respectively, from the equational, tabular, and textual data represented at blocks 47, 46, and 48. Lines 49, 50, and 52 are shown extending to the operation represented at symbol 54 whereupon the translated data then are submitted to the noted TeX program as represented at line 56 extending to operation symbol 58. The TeX program 58, in carrying out the formatting of each page of materials, employs the graphics size data earlier developed and represented at block 26. This employment is represented by line 60. Additionally, the TeX program as represented at 58 used font size data made available in magnetic medium per election (by macro instructions discussed in detail later herein) of a font by the producing personnel as represented at block 62. These data are shown extending to the TeX operation at symbol 58 as represented at line 64. The data thus supplied to the TeX program includes equational material, tabular material, textual material, font size material, and the size data for any graphics involved. Thus, formatting can be carried out and such formatted material then, as represented at line 66, is made available as a formatted device independent (DVI) page file represented by block 68. As noted above, however, the material available from the TeX program as represented at symbol 58 will not contain data representing the font images, per election, but only size data and further will not contain the image data for the graphics developed from scanning and the like as represented at block 30. Accordingly, as represented at line 70, the graphic image data are made available to the DVI file as at 68 as a separate component. In similar fashion, the data required for imaging individual fonts also are made available to the DVI files represented at block 68. In this regard, the elected font image data are represented at block 72 and the input to the DVI files represented at block 68 is shown at line 74. The materials thus generated, then are retained, as represented at line 76 and symbol 78, in a master tape suitable for producing a readily disseminated local memory such as a CD ROM. Also retained on the master tapes as represented at symbol 78 are the index data which are generated from the SGML files which previously have been developed as discussed in conjunction with symbol 40. In this regard, the data are subject to an index generation operation as represented by line 80 and operation symbol 82 labeled "INDEX." The index will include an alphabetical listing of the unique, refined words in any given article referenced for instance by field, paragraph, and sentence. These materials then are submitted to the master tape as represented at line 84. In similar fashion, it is necessary to provide sufficient data for employment of the local memory with any of a variety of personal computers and, thus, necessary data as represented at block 86 entitled "PC SOFTWARE" are submitted as represented at line 88 to the master tape represented at symbol 78. It may be observed that the device independent materials now contained in the master tape 78 will be uniform in generated output from output device, i.e. monitor or printer, to output device notwithstanding the brand of such components employed. The master tapes then are used to generate a local memory which, as represented at line 90 and symbol 92, may be provided as a CD ROM. As noted above, one such CD ROM is capable, for example, of retaining a ten-year assemblage of scientific journals or approximately 30,000 complex pages. Because of the relatively low cost of producing such CD ROMS, they then may become available to individual researchers in lieu of conventional library facilities.

Figure 2B:
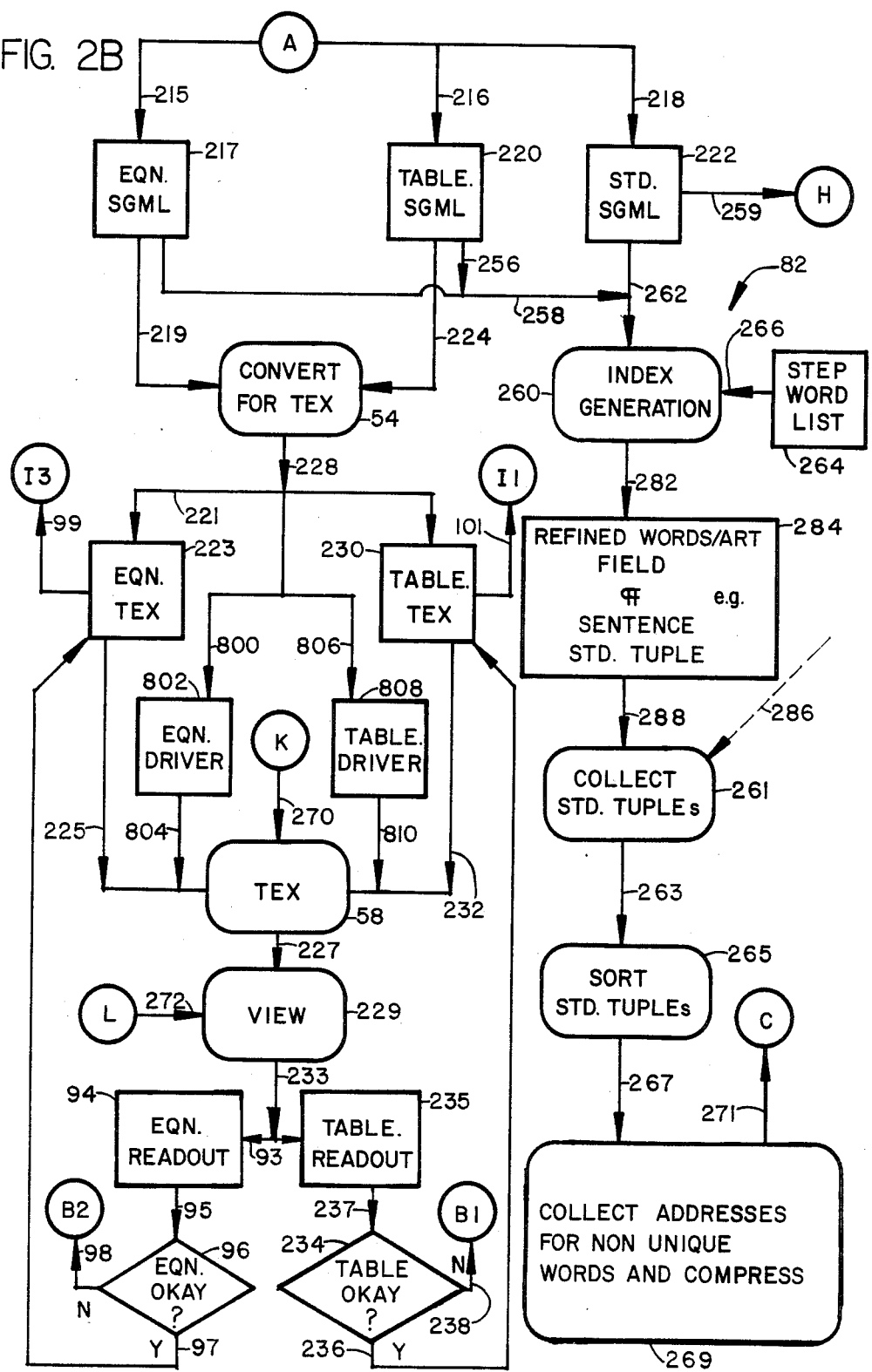

Referring to FIGS. 2A–2D, the system and method 10 is portrayed at an enhanced level of detail. In FIG. 2A, the publisher's typesetting tapes again are represented it symbol 14 as being evaluated with respect to the character definition originally employed by the publisher. For the instant process, it is preferred that the character be formatted in ASCII, whereas, publisher's typesetting tapes, may be provided having other text formats such as EBCDIC. Accordingly, as represented at line 104 and block 106 a determination is made as to whether the character format of the tapes is ASCII. In the event that they are not, then as represented at line 108 and operating symbol 110, the tape data are converted to ASCII whereupon, the process continues as represented at lines 112 and 114. Where the original tapes are in ASCII character format, then, as shown at line 114 the system proceeds to an operation represented by a program identified as "WHATART" shown at symbol 116. The WHATART program functions to collect all of the ASCII files associated with a single article. In this regard, the article may be a given article of a scientific journal, a chapter or section of an encyclopedic work or the like. These files are collected in a directory format as represented by line 118 and block 120. This directory of files for each article will, for example, include information as to title, volume, the first page of the given journal or volume in which the article appears, and the like. Looking momentarily to FIG. 3, a directory file tree exemplary of the materials represented at block 120 is revealed. Here, for example, the title of the work is represented at block 122 and is shown having a sequence of volumes from first to twenty-fifth represented, respectively, as "VO1" at 124 and extending to "V25" as at 126. A given volume for the subject at hand, for example the twelfth, then is represented at 128 as "V12." This volume is shown to have articles commencing with page 1 as shown at 130 as "P0001," article in question starting at an intermediate page identified as "P0557" at 132 and the last article being shown as commencing at a page identified as P"1015" as shown at 134. With respect to this location in the process, the file tree will include all the ASCII files necessary for a single article as represented at 136 identified as "STD.ASCII." Other files identified in the instant figure will be described as the decription unfolds. It is important to note that while the process is carried out on a per article basis, "SHELL" programs are employed by process operators to enable the computers to simultaneously carry out individual process steps on a per volume basis.

Returning to FIG. 2A, the process continues as represented at lines 138 and 150. Line 138 leads to block 140 wherein an inquiry is made as to whether the original data supplied by the publisher provides a numbering of paragraphs. In the event that the paragraphs are not so numbered, then as represented at line 142 and processing symbol 144 the paragraphs are numbered sequentially. The process then continues as represented at lines 146 and 148. As represented by both lines, the process continues to the earlier-described conversion to SGML at symbol 40. Meanwhile, line 150 leads to the WHAT-GRAPH analysis described earlier in conjunction with symbol 36. The latter symbols 36 and 40 again are represented by the same numeration in the instant figure.

Figure 4:
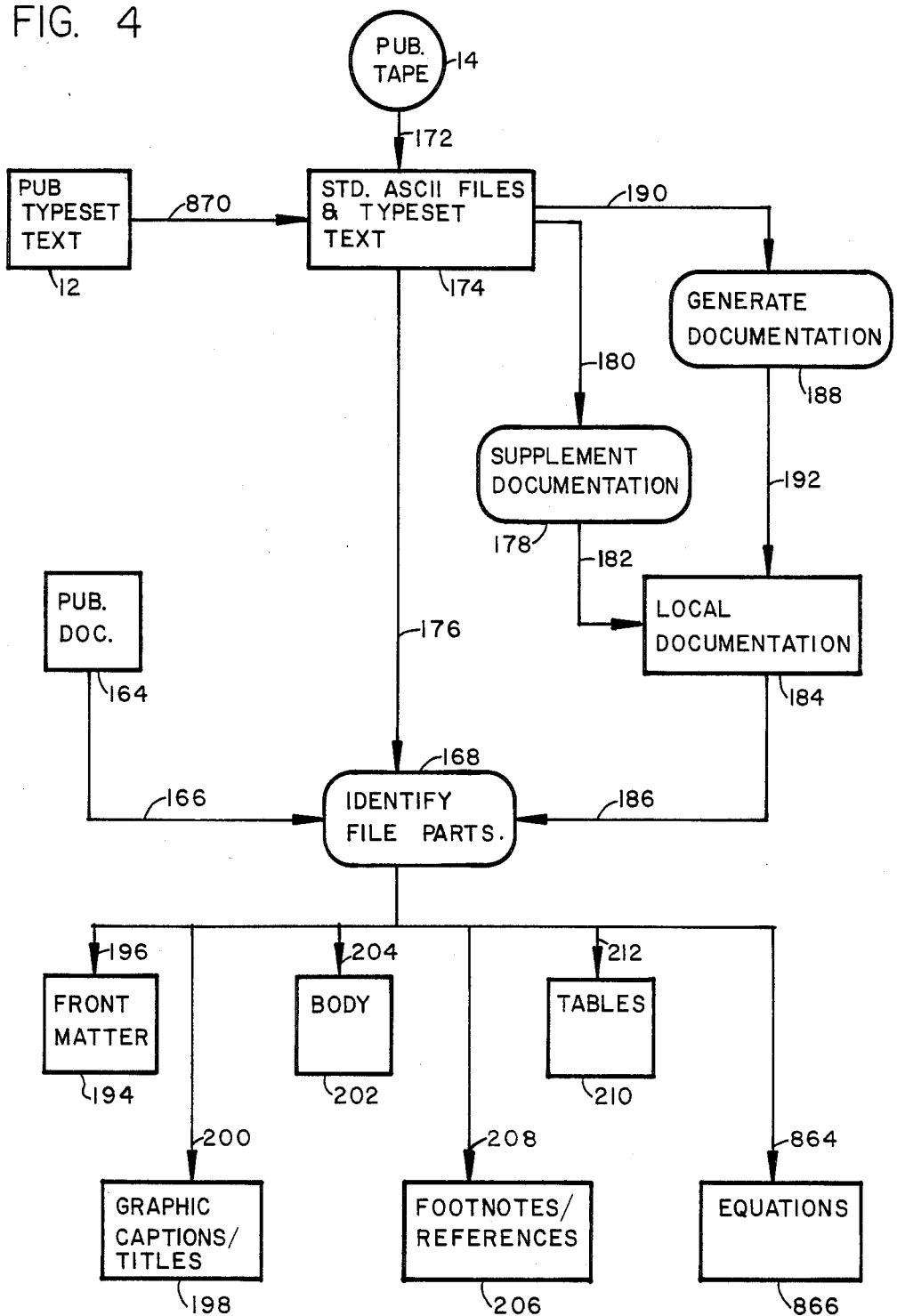
FIG. 4 is an exploded view of the SGML conversion step of the invention.

As noted earlier in conjunction with the discourse concerning symbol 40, a variety of considerations are involved in generating a program for conversion to SGML. Several programs may be involved depending upon the materials being converted. Referring to FIG. 4, exemplary considerations entering into the development of such a program or programs are revealed in diagrammatic fashion. The initial consideration concerns identifying how the original publisher-supplied information is arranged and with what identifying indicia. For example, in the event that the publisher provides some documentation, then that documentation as represented at block 164 may be employed as represented by line 166 and block 168 for the purpose of identifying components of the publisher's tapes by the associated, individual file parts. As eariler discussed, the publisher will provide typesetting tapes (symbol 14) and typeset text (block 12) and, as represented by lines 172 and 870, and block 174, where an ASCII character format and sufficient documentation is initially provided, then the individual ASCII files will be available for identification without conversion as represented at line 176 and block 168. However, where the publisher's documentation is not sufficient, then some separate analysis is required. In this regard, as represented at block 178, the information available from both the ASCII files and the typeset pages as represented at block 174 is employed as represented at line 180 to aid in developing such supplemental documentation necessary for the instant process as represented at line 182 and block 184. The local documentation as represented at block 184 then, as represented at line 186, may be employed for the purpose of identifying individual file parts as described in conjunction with block 168. Where the publisher does not provide any documentation, as represented at block 188, then a separate analysis is carried out employing the individual ASCII file information and typeset pages as shown at block 174 and line 190 to evolve original, local documentation as represented at line 192 extending to earlier-described block 184.

Depending upon the above procedure employed, the individual parts of the files which are identified as represented at block 168 will include "FRONT MATTER" as represented at block 194 extending from block 168 and represented by line 196. The FRONT MATTER will include such publisher information as special characters, publisher name, title, volume, issue, first page, and last page. Special characters for the title then can be identified. Author identification will include the determination of special characters to be involved, first name, last name, middle name, and any title associated with the author. Additionally, any institution involved may be identified by special characters and the abstract for the article at hand may be provided with special characters.

The individual parts of files at block 168 also may involve "CAPTIONS AND/OR TITLES" for graphic material as represented at block 198, any text identification of graphics is delineated as well as special characters employed within captions or titles. Block 198 is seen associated with block 168 via lines 200.

As represented at block 202 and line 204, the file part identification also will include designation of components of the "BODY" of the text. This will include the number assigned each paragraph which are later used both for generating a word index for the entire local memory and a table of contents for each individual article. Section headings and special characters appearing therein also are identified and references within the body to tables, figures, equations, charts, references, and other files also are identified. Where equations are employed in the text, then labels, multiple line and special character type information is evolved.

As indicated at block 206 and line 208, the noted identification also will include identification of "FOOTNOTES AND REFERENCES" and, as represented at blocks 210 and 866, and lines 212 and 864, "TABLES" and "EQUATIONS" also are considered. The latter consideration for TABLES will include identification materials for the table, title for the table, the columns involved, and any such tabulation including heading materials, type and justification entries, and special characters involved. The latter consideration for EQUATIONS will include mainly type and justification entries, and special characters involved.

Returning to FIG. 2A, all of the above considerations will have been made with respect to the conversion to SGML as discussed in conjunction with symbol 40. Once this conversion has been completed, then as represented at line 214 and node A, the process continues as represented in FIG. 2B by the same node designation and lines 215, 216, and 218 to establish three distinct files, an "EQN.SGML" as represented at block 217, a "TABLE.SGML" file as represented at block 220, and a "STD.SGML" file as represented at block 222. It should be understood, in view of the commentary supplied in conjunction with FIG. 4, that one or several programs may be employed to develop these files as represented at blocks 217, 220, and 222. As noted above, it is advantageous to develop the equation and table data from the publisher's tape data avoiding the scanning techniques associated with conventional graphics. This results in a substantial savings of memory space. However, because equations and tablelike compilations may be somewhat complex from the standpoint of the typesetter, they preferably are treated specially within the instant process. In this regard, the EQN.SGML file and TABLE.SGML file are seen to be directed as shown, respectively, at lines 219 and 224 to the conversion process represented at operation symbol 54 discussed earlier wherein the table data per se are converted to standardized format for the TeX program. Accordingly, as represented at lines 228 and 221, and blocks 223 and 230 there evolves two files designated "EQN.TeX" and "TABLE.TeX" which are specific to these equation and table data. Two additional outputs of the conversion to TeX format are utilized by the TeX program to permit stand alone formatting of the tables and equations without insertion position callouts. Accordingly, the "EQN.DRIVER" and "TABLE.DRIVER" files at blocks 802 and 808 are shown extending from the conversion process along respective lines 800 and 806, and to the TeX program via lines 804 and 810. Because these equation and table data may be prone to vagaries as noted above, they are checked early in the process by TeXing them at earlier discussed block 58 as represented by lines 225 and 232, and node K and assertion line 270 carrying font size data as discussed later herein in conjunction with FIG. 2D. Then as represented at line 227, node L and assertion line 272 carrying font image data as discussed later herein in conjunction with FIG. 2D, and symbol 229, a "VIEW" program outputs the equations and tables for inspection via process lines 233 and 93, as represented at respective blocks 94 and 235. The determination as represented at blocks 96 and 234 is one of visual inspection by a process operator, of a read-out of the equation or table in question as represented by process lines 95 and 237. This is a form of "pre-check" within the conversion process. In the event the inspection shows the table to be in appropriate form, the process continues as represented by lines 97 and 236, and no action is taken to alter either the TABLE.TeX or EQN.TeX files of blocks 230 and 223. However, where a correction is deemed necessary, then as represented at line 98 and 238 and, nodes B2 and B1 a change program is employed. Returning momentarily to FIG. 2A, node B again is reproduced showing a line 240 leading to a file prepared for carrying out any apropriate changes in the inspected equation or table as identified as "STD.CH" at block 242. The change program as represented at line 244 and symbol 246 enters changes into the process stream when it reaches the appropriate position in a given ASCII file as represented by interactive process lines 248 and 249 extending to earlier-described block 120. It may be observed that the change thus carried out is one wherein the alteration, in the present embodiment is made at the STD.ASCII level as represented at block 120. Thus consideration must be made as to how this particular file again will appear when converted to the TeX format, i.e. as and EQN.TeX or a TABLE.TeX file as represented at blocks 223 and 230, further consideration being made of the operations carried out in developing the EQN.SGML and TABLE.SGML files at blocks 217 and 220.

Figure 3:
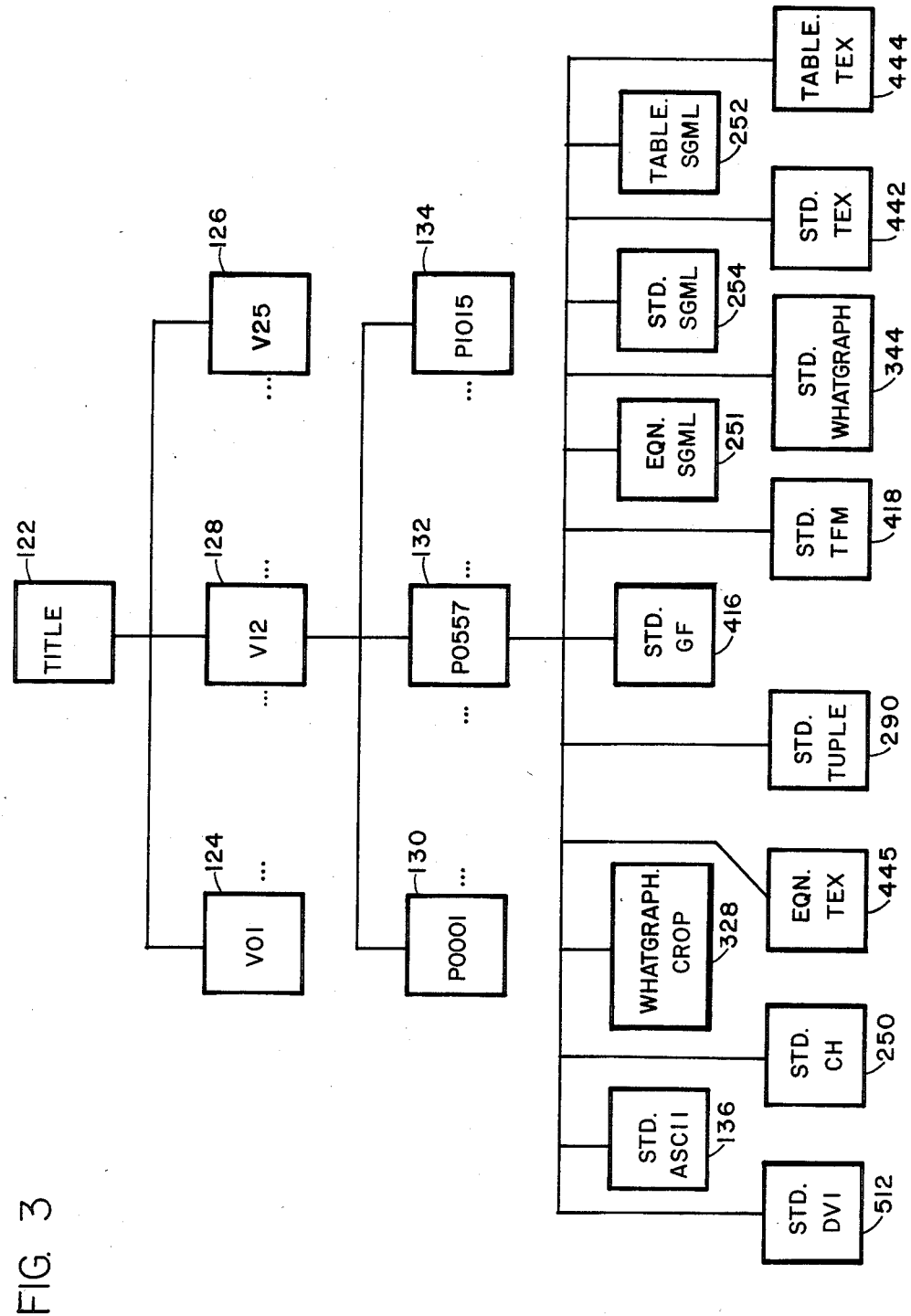
FIG. 3 is an exemplary directory file tree for the invention.

Referring momentarily to FIG. 3, it may be observed that the earlier-described directory file tree also will include the STD.CH file is shown in the figure at 250. Additionally, as discussed in conjunction with blocks 217, 220, and 222 in FIG. 2B, the EQN.SMGL file is seen at 251, the TABLE.SGML file is seen at 252, and the STD.SGML file is shown represented at 254.

FIG. 2B further illustrates that the TABLE.SGML and EQN.SGML files at blocks 217 and 220 are employed as shown by lines 256 and 258 for the process of carrying out the generation of an index as represented at symbol 260. Additionally employed in this index generation operation shown generally at 82 as discussed earlier, are the data provided by the STD.SGML file shown at block 222 as represented at line 262. Thus, an index is generated with respect to the words contained not only in the text but also in the table representation of the document at hand. To refine the word listing of the index, a stop word list is supplied to the process at symbol 260 as represented by block 264 and line 266. The latter stop list will avoid index consideration of prepositions, articles and the like. The operation represented at symbol 260 is one wherein every word in the article at hand is evaluated with respect to the stop word list. Once that evaluation is made, then, for each word, where appropriate, those words are associated with appearances in fields such as title, abstract, or the like; paragraph numbers; and sentences. The process continues as represented at line 288 directed to symbol 261 wherein the STD.TUPLE files are collected for every article as represented in diagrammatic fashion at dashed process assertion line 286. Following merger the contents of the STD.TUPLE files are sorted as shown by line 263 and operational symbol 265. The final step in generating the index involves collecting the field, paragraph, and sentence "address" for every word and compressing the file to include only unique refined words as represented at line 267 and symbol 269 with the process continuing along line 271 to node C.

FIG. 3 shows that a refined word list designated "STD.TUPLE" also is generated with respect to each article as represented at 290.

Returning to FIG. 2A, the paper text input to the process is considered, as before, commencing with the publisher's text material as represented at block 12. These materials, as represented at line 292 and symbol 294 are evaluated for the presence of graphics material at an operator station. From this station, as represented at line 296 and symbol 298, the pages of the paper text which have been determined to contain graphics material are processed, for example, by a CCITT Group 4 scanner device. Because it is desirable to associate the page of the document upon which the graphics occur with the information developed from the scanner station, a start page function represented at block 300 is associated with the scanner program 298 as represented by line 302. Where grahics occur on continuing sequences of pages of the text, then the process can be somewhat automated. Generally, the pages of the paper text which are subject to the scanner station operation are scanned with respect to even numbered pages initially and then odd numbered pages. By providing the pagination data at this juncture, cross-checks with the position of graphics on the publisher's tapes becomes available. As represented at line 304 and symbol 306, the program represented at symbol 298 is executed by a Group 4 scanner/digitizer and the resultant output thereof as represented at line 308 and block 310 is a file of Group 4 images designated ".GP4.". Generally the files will be identified by a page number name assigned by the program and the ".GP4" tail as shown in block 310. For example, the file may be designated as "P1234.GP4."

Processing then continues as represented at line 312 and symbol 314 to convert the files to a "_.GF" designation representing a "GENERIC FONT" identification. The instant approach is one wherein graphic images are considered as a single character, i.e. a character by the TeX program in evolving a given page format.

The result of the operation of symbol 314, as represented at line 316 and block 318 in an assemblage of GENERIC FONT images identified as —.GF" files. An example of such an identification would employ an abbreviated article title along with an associated page number, i.e. "TITLE1234.GF."

The process then proceeds as represented at line 320 to carry out the CROPping procedure as earlier described in connection with FIG. 1 at symbol 22. That symbol is reproduced in the instant figure. In similar fashion, it may be observed that line 150 leads from the ASCII files as represented in exemplary fashion at block 120 to the earlier-described WHATGRAPH procedure at symbol 36. This procedure carries out an analysis as to the presence and location of graphics identification data contained in the publisher's typesetting tapes. The procedure 36, as represented at line 322 and block 324, evolves data which are identified by the "WHATGRAPH.CROP" file providing information as to graphics location which is used in the CROPping procedure represented at symbol 22 as a cross reference as shown symbolically by line 326. This WHATGRAPH.CROP file is represented in FIG. 3 at 328.

Figure 2C:
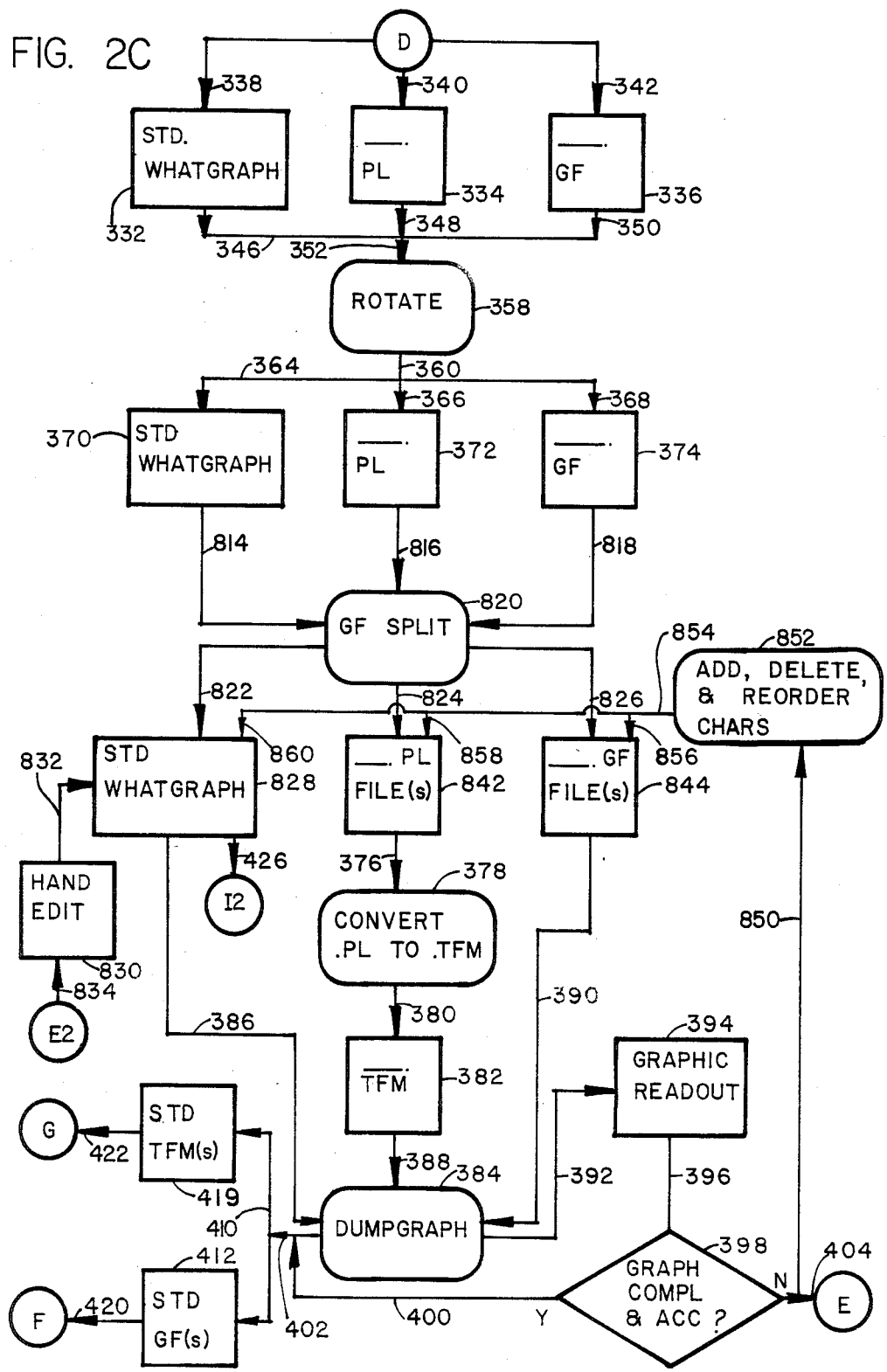

Returning to FIG. 2A, the result of the CROPping procedure represented at symbol 22 is, as shown by line 330 and node D leading to FIG. 2C, a series of three files shown identified as blocks 332, 334, and 336 coupled to respective process lead lines 338, 340, and 342. Block 332 shows a file identified as "STD.WHATGRAPH" which carries the critical characteristics of the article's graphics items such as where in the text the graphics item is located, what type of graphic it is, the number of parts to a graphic, whether or not it "continues," and whether it is rotated or not. Correspondingly, block 334 identifies a "_.PL" or property list file showing the size of image. A typical identification for this file would be, for example, "P1234.PL" wherein now the page number represents the first page of the article, as the property lists for individual graphics have been merged into a single file. Finally, block 336 carries a GENERIC FONT file identified as "_GF" which carries the scanned image data itself, now for all the graphics in a given article. A typical representation of this file would, for example, be "P1234.GF," wherein the page number again now represents the first page of the article. Looking momentarily to FIG. 3, the STD.WHATGRAPH file is shown represented at 344.

Returning to FIG. 2C, the process is shown to continue as represented by lines 346, 348, 350, and 352 to the operation represented by symbol 358 labeled "ROTATE" wherein an evaluation is made of STD.WHATGRAPH as to whether each of the graphics which have been developed for an individual article are aligned vertically or horizontally along a given path of text. In the event that a vertical alignment is at hand, then a rotational step is carried out to provide uniformly horizontal graphics representations by altering the files of blocks 332, 334, and 336 as necessary, and the process is continued as represented at line 360. Of course, if no rotation is required of any of the graphics for a given article, then the process continues as represented at lines 360, 364, 366, and 368 to provide the above-noted unaltered STD.WHATGRAPH, _.PL, and _.GF files. The process then continues in similar fashion along lines 814, 816, and 818 to an operation labeled "GF SPLIT" as represented at symbol 820 which creates splinter files from the original _.PL and _.GF files to SPLIT complicated tables into two or more pieces. The tables are SPLIT to sidestep TeX limitations such as a maximum of fifteen font sizes and the like. The STD.WHATGRAPH file correspondingly is altered to note any SPLITting which may be carried out. As represented at line 376 and symbol 378 it then is necessary to convert the PROPERTY LIST for the graphics involved to a format compatible to the TeX formatting program. This is provided by converting the PROPERTY LIST data to a"_.TFM" file generally referred to as "TeX FONT METRIC." The resultant TeX FONT METRIC file then is represented as being developed in the process by line 380 and block 382 shown as labeled _.TFM. The data now represented by the file at block 382 along with the STD.WHATGRAPH file and the _.GF file described in conjunction with respective blocks 370 and 374 is treated by a "DUMPGRAPH" program represented at symbol 384 as represented by process lines 386, 388, and 390. The DUMPGRAPH program functions, as represented at line 392 and block 394 to provide a graphics read-out which may be reviewed by a process operator for completeness and accuracy. In this regard, the process is seen to continue as represented by line 396 and block 398. In the event that the graphics are complete and accurate then as represented by lines 400 and 402, the process continues. On the other hand, where an inaccuracy or the like is determined by the evaluation represented by block 398, the process returns as represented at line 404 and node E to a series of revision procedures. In the latter regard, corresponding node E1 is shown reproduced in FIG. 2A as coupled to process line 406 leading to the scanner digitizer symbol 306. Thus, should the graphics evaluated in conjunction with block 398 be askew or have some similar deficiency, the appropriate page of text again is scanned for corrective purposes. Further, a graph may not have been CROPped properly; so that reCROPping may be necessitated as represented by line 408 extending to symbol 22. Returning to FIG. 2C, corresponding node E2 is shown coupled to process line 834 leading to the "HAND EDIT" operation as represented at block 830 which enables the process operator to manually alter the STD.WHATGRAPH file via line 832 should a minor change be necessary. Additionally, as represented at line 850 and operation symbol 852 three change programs may be employed to "ADD," "DE- LETE," or "REORDER" a character or series of characters within either the STD.WHATGRAPH, _.PL, and _.GF file(s) as represented by respective process lines 854, 860, 858, and 856.

The DUMPGRAPH operation represented at symbol 384 is seen to be directed along line 402 to line 410 wherein the files for an entire article are renamed at blocks 412 and 414. Block 412 contains the "STD.GF" file which represents all data for a given article corresponding with all the scanned images for that article. Block 414 represents a file for an entire article labeled "STD.TFM" containing all property data for the images, i.e. concerning size, shape, and the like.

Turning momentarily to FIG. 3, the STD.GF file is shown at 416 while, correspondingly, the STD.TFM file is shown represented at 418.

Returning to FIG. 2C, the process is seen to continue from block 412 as represented at line 420 entering node F, while correspondingly, the process from the files at block 414 is seen to progress as represented by line 422 and node G.

Figure 2D:
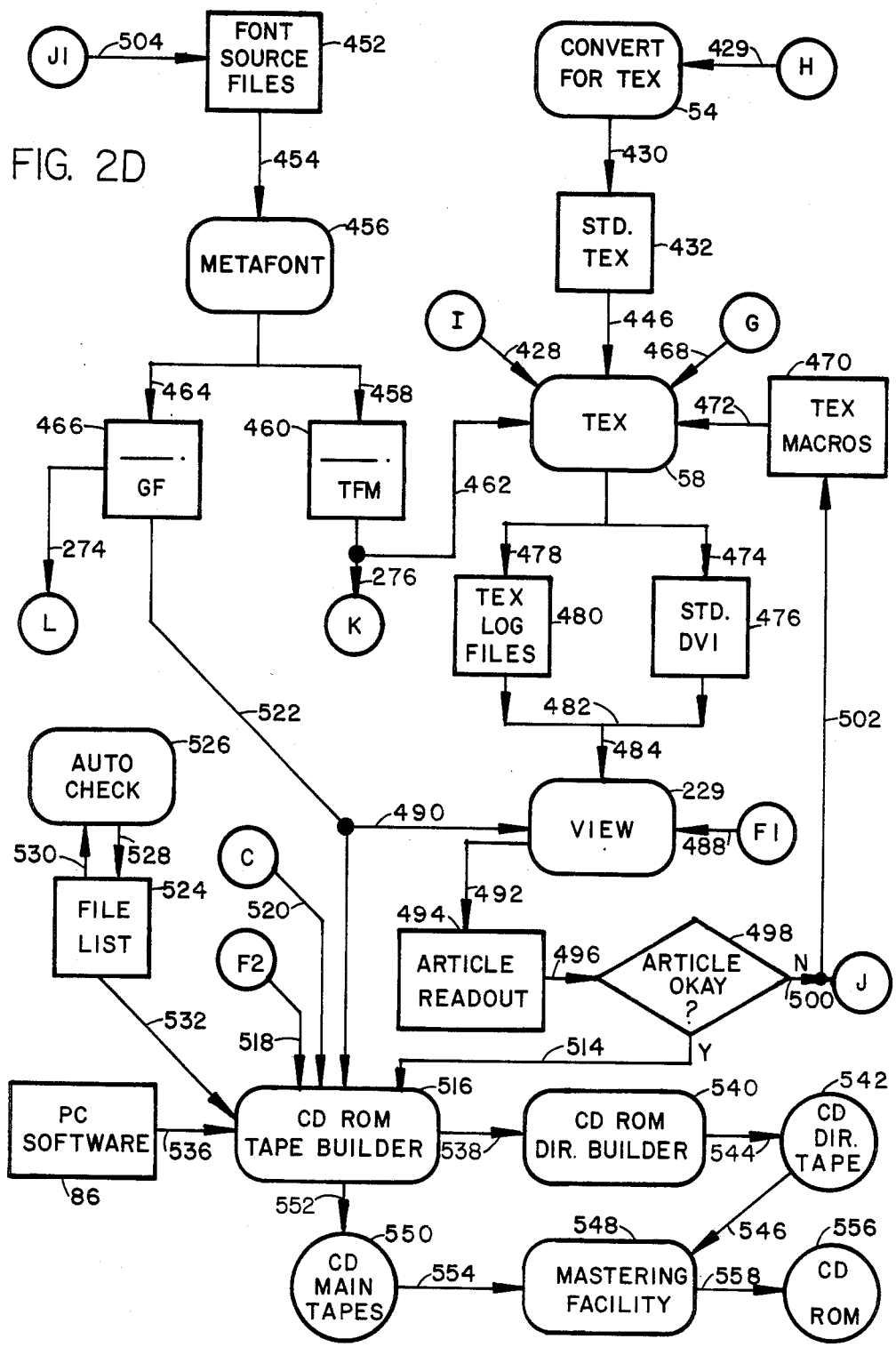

As described earlier herein in conjunction with FIG. 2B, the textual data are developed as the STD.SGML file described in conjunction with block 222. The process flow from this block additionally is shown at line 259 extending to node H which, referring to FIG. 2D, is seen to reoccur, whereupon the process continues as represented by line 424 which leads to the process for converting to TeX format which again is represented by symbol 54 as described in conjunction with FIG. 1. The processing carried out in conjunction with symbol 54 then provides a "STD.TeX" file represented by line 430 and block 432 and containing a text file suited for formatting on a page-by-page basis by the TeX program.

Block 432 then is directed in the process as represented by line 446 to the TeX program described earlier in conjunction with symbol 58 in FIG. 1 and introduced with that numeration in the instant figure. Also employed by the TeX program 58 are font defining data which may be developed by the processing entity for instant use. In this regard, block 452 describes font source files which contain data representing instructions as to the construction of the characters for any of a select variety of font styles. These data are then provided in the process as represented by line 454 to a "METAFONT" program represented by symbol 456. The METAFONT program functions to construct the fonts as may be derived from the source file instructions. This program is described, for example, in "The METAFONTbook" by D. E. Knuth, Addison Wesley Publishing Company, Reading, Massachusetts. The METAFONT program 456, as represented at line 458 and block 460 provides a "_.TFM" file relating to the size characteristics of each font which is employed by the TeX program 58 as represented by lines 462 and 276, and in FIG. 2B as represented by line 270 and node K, in page formatting procedures. The METAFONT program as represented at symbol 456 also provides, as represented at line 464 and block 466 a "_.GF" file which contains image defining data for each of the fonts. The font image data also is supplied via line 274 and node L to the pre-TeX operation described in conjunction with FIG. 2B. An example of a data call-out for the latter _.GF and _.TFM files may, for example, be provided as "MRTXT10.GF" wherein the term "MR" refers to the font family; the term "TXT" refers to the font style; the term "10" refers to point size; and the term "GF" refers again to "GENERIC FONT"; and the term "TFM" refers again to "TeX FONT METRIC." However, in this case, the data truly relates to fonts and not graphics. Also inputted to the TeX program 58 is the graphics size or STD.TFM files developed and described earlier in conjunction with FIG. 2C and presented via node G now reproduced in the instant figure as being directed to the TeX symbol 58 via line 468. The TeX program, in conjunction with its formatting performance, operates in conjunction with a collection of macro instructions and programs represented at block 470 labeled "TeX MACROS" and shown associated with the program at symbol 58 via line 472. Generally, these TeX MACROS are the inputs to the TeX program, for example, with respect to line and page breaking; the development of mathematical formulas and complex equations; labeling techniques for tables and graphics; special character definitions; chemical equations suited for the TeX program; font sizes; and font styles and the like. A more detailed analysis of the MACROS employed follows. it has been found that graphics describing chemical molecular structures showing bonds and the like are preferably produced through the scanning technique as described in conjunction with FIG. 2A. Additionally, line 426 in FIG. 2C is seen leading from STD.WHATGRAPH of block 470 to the corresponding node D for assertion to the TeX program via node I and line 428 as seen in FIG. 2D leading to symbol 58. The STD.TeX file is seen in FIG. 3 at 442, while the TABLE.TeX file is seen in that figure at 444, and the EQN.TeX file is seen at 445.

The TeX program represented at symbol 58 provides, as represented at line 474 and block 476 a device independent file labeled "STD.DVI" containing appropriately formatted text materials wiht spacings, identifications and the like for the insertion of concluding scanned graphics images. The TeX program also provides a series of error messages and the like as represented by process line 478 and block 480 labelled "TeX LOG FILES." These messages will identify ambiguous formatting areas which have been determined by the TeX program itself.

The process then proceeds as represented by lines 482 and 484 to a VIEW program represented at symbol 229 which as described earlier in conjunction with FIG. 2B responds to the files represented at blocks 476 and 480 as well as to the scanned image data for the graphics which have been previously evolved at line 420 and node F in FIG. 2C and now are presented via node F1 and line 488. In similar fashion, font image data are supplied from the general font file described in conjunction with block 466 and shown begin inserted via process line 490. The result of the VIEW program then is shown directed in the process via line 492 to produce an article readout represented at block 494. This article readout then is examined by the process operators for visually detectable faults and TeX log file messages. The evaluation of this readout as represented at block 494 is provided in the process as represented by line 496 and decision block 498. The evaluation of the article as represented at the latter block is a final proofing. In the event that the article has an error which needs correction, then any of a sequence of corrective procedures may be carried out. In this regard, as represented at line 502, any formatting errors may be corrected by altering the TeX MACRO instruction files as described briefly in conjunction with 470. The correction procedure also proceeds as represented via line 500 and node J as input into the font source files as represented at corresponding node J1 and line 504. Thus if the characters are imperfect, a correction may be made to the font source file at block 452. Referring additionally to FIG. 2A, for spelling errors or the like as represented by corresponding node J2 and line 506, a program for changing the data stream at appropriate places in the ASCII files is carried out. In effect, a reiteration of the entire process is made at this point, this being the first instance of the operator seeing a fully printed article from the process.

Referring again to FIG. 3, it may be observed that the earlier-described STD.DVI file, as described in conjunction with block 476 in FIG. 2C is represented at 512.

In the event the given article is determined to be acceptable by the operator as described in conjunction with block 498, then the process proceeds as represented by line 514 to the CD ROM tape builder program represented at symbol 516. This program accumulates the diverse data developed in the process including as represented by line 514 the device independent (STD.DVI) files. Additionally, however, as represented at node F2 which is considered to be an extension of node F from FIG. 2C and as represented by line 518 the STD.GF files or those files containing graphics information are supplied to the tape builder program 516. Further, as represented at node C and line 520, the alphabetized list of unique refined words and their addresses for every article to be placed in the master memory, are supplied to this program. Finally, the font images (_.GF files) evolved from the METAFONT program described at block 466 are shown asserted by process line 522.

As indicated above, a substantial amount of data are involved in the development of a local memory such as a CD ROM, a ten-year compilation of scientific journals or an encyclopedic work being representative of typical databases. In order to assure that all files for all articles of the entire publication are present, a file list is progressively generated as represented at block 524 and this list is subjected to an automatic checking procedure as represented by the program at symbol 526 and interactive process line 528 and 530. In this regard, once the materials are generated in master memory, the data are fixed and thus a checking procedure is of considerable value at this point in the process. The file list input to the CD ROM tape builder program at symbol 516 is represented at line 532. This file list also is utilized to aid in constructing the master memory directory. Additionally supplied to this CD ROM tape builder is the PC SOFTWARE as discussed earlier in conjunction with FIG. 1 and represented again at block 86 to be asserted along process line 536. The CD ROM tape builder program at symbol 516 also is associated in the process as represented at line 538 with a CD ROM directory builder program represented at symbol 540. This directory is employed to collect the addresses of all the files as they are placed on the tape. A CD directory tape as represented at symbol 542 is developed from CD ROM directory builder program as represented at line 544 and, as represented at line 546, the information on the directory tape is submitted to a mastering facility as represented at symbol 548. Also supplied to this mastering facility at 548 are the main tapes evolved from the CD ROM tape builder program at 516. These tapes are represented at symbol 550 as being developed from the tape builder program 516 via process line 552 and are shown asserted to the master facility via process line 554. Generally, about six main tapes as represented at 550 and a directory tape as represented at 542 having lengths, for example, of 2400 feet each are employed by the mastering facility 548. The latter facility is employed then to produce any of a number of local memories such as CD ROMs as represented at symbol 556 and associated with the master facility 548 via line 558. While a number of local memory techniques are available and under development, currently, the CD ROM provides an effective memory which is reproducable at relatively lower costs for wide dissemination to investigators requiring the type of information discussed above.

Returning to block 470 of the instant figure, the TeX MACROS have been described as being those supporting instructions for the formatting process wherein a standardized or device independent data compilation is achieved. These TeX MACROS are generated as a result of an intial analysis of the materials made available from the publisher. It may be recalled from FIG. 4 that the publishers in some instances will provide documentation which they have generated as discussed in connection with block 164 of that figure. Where that documentation is not adequate, as discussed inconjunction with symbol 188, then it is incumbent upon the process operators to generate documentation and/or provide supplementary documentation as represented at symbols 188 and 178, respectively. This gleaning of information concerning the publication at hand is represented in the process diagram of FIG. 5 in general at block 568. From this information, a sequence of TeX MACROS are developed as represented by the array of blocks at 570. For example, the anaylsis represented at block 568 will, as represented at line 572 and block 574, provide for the relatively short data necessary for creation of temporary storage files employed by the TeX program during run time. Thus, as represented at line 576 and block 578 the "TITLE.HDR" macro now represented at 574' within node 470 is made immediately available to the TeX program without further processing.

The remaining macros of the array 570 are of a more elaborate nature and, since they need not be loaded at run time, may be preprocessed to speed access by the TeX program. Documentation block 568 is seen to produce the first of these larger non-run-time MACROS as represented at line 580 and block 582, the latter being labeled "TITLE 2.HDR." Similarly, line 584 is seen representing the MACROS made available in conjunction with the TeX program at block 586 labeled "PLAIN.TeX"; line 588 is seen to represent development of a MACRO at block 590 labeled "SPECCHAR.TeX"; line 592 labeled "TBLMASC.TeX"; line 596 is seen representing the development of the MACRO at block 598 labeled "GRAPHICS.TeX"; and line 600 is seen leading to a MACRO at block 602 labeled "FONTS.TeX." Each of these MACROS of array 570 is described in detail later herein. To speed up the operation of the TeX program as described in conjunction with block 58, each of these programs is treated by a TeX pre-load program called "INITeX.BIN" as represented at symbol 604. In this regard, the submittal of the instruction files from blocks 582, 586, 590, 594, 598, and 602 being represented, respectively, at lines 606–611. The thus-treated instruction files as represented at symbol 604 then are made available as represented by line 614 to node 470 as a format file represented at block 616 and entitled "TITLE.FMT."

Figure 5:
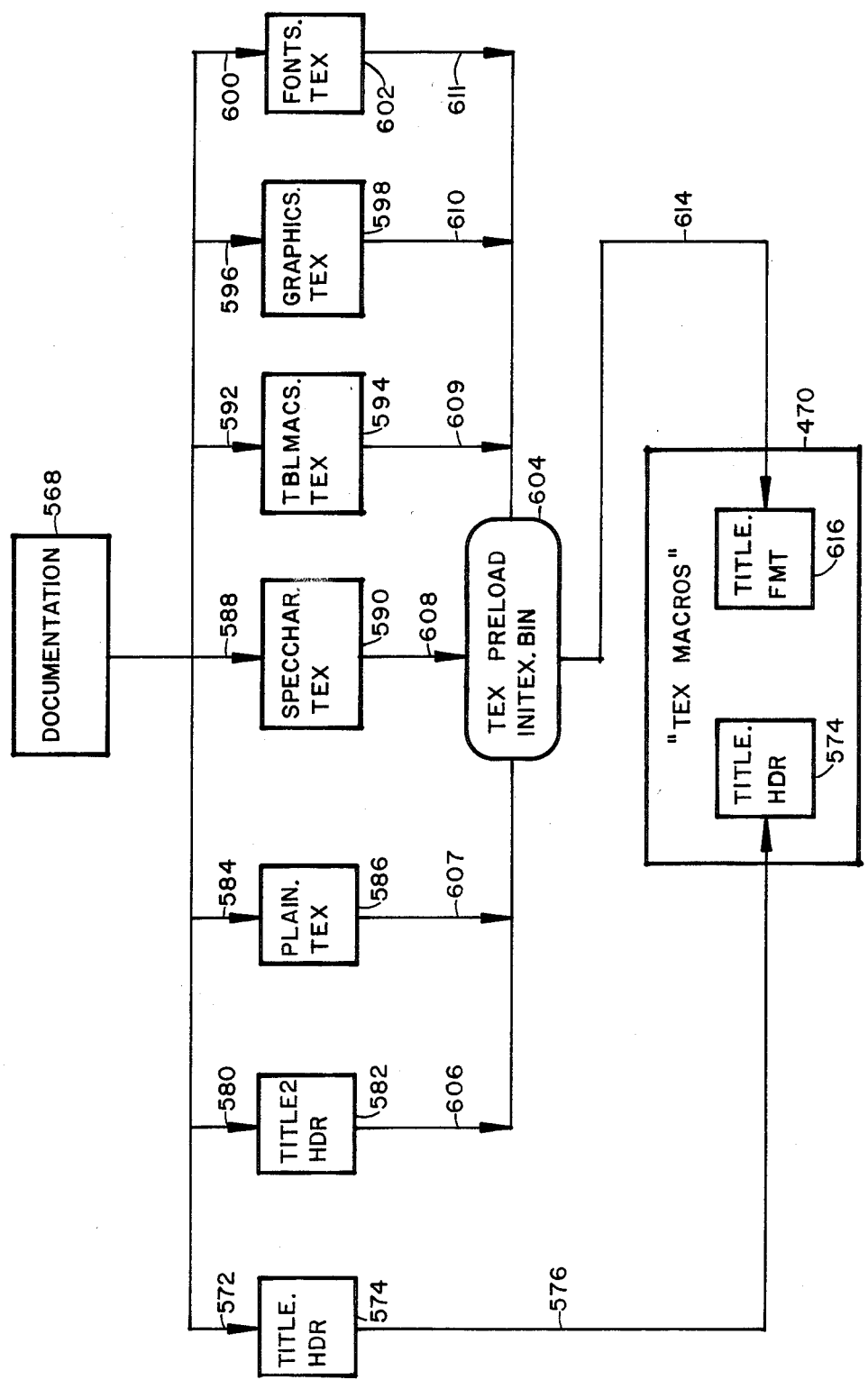
FIG. 5 is an exploded view of the TeX MACROS step of the invention.
Figure 6:
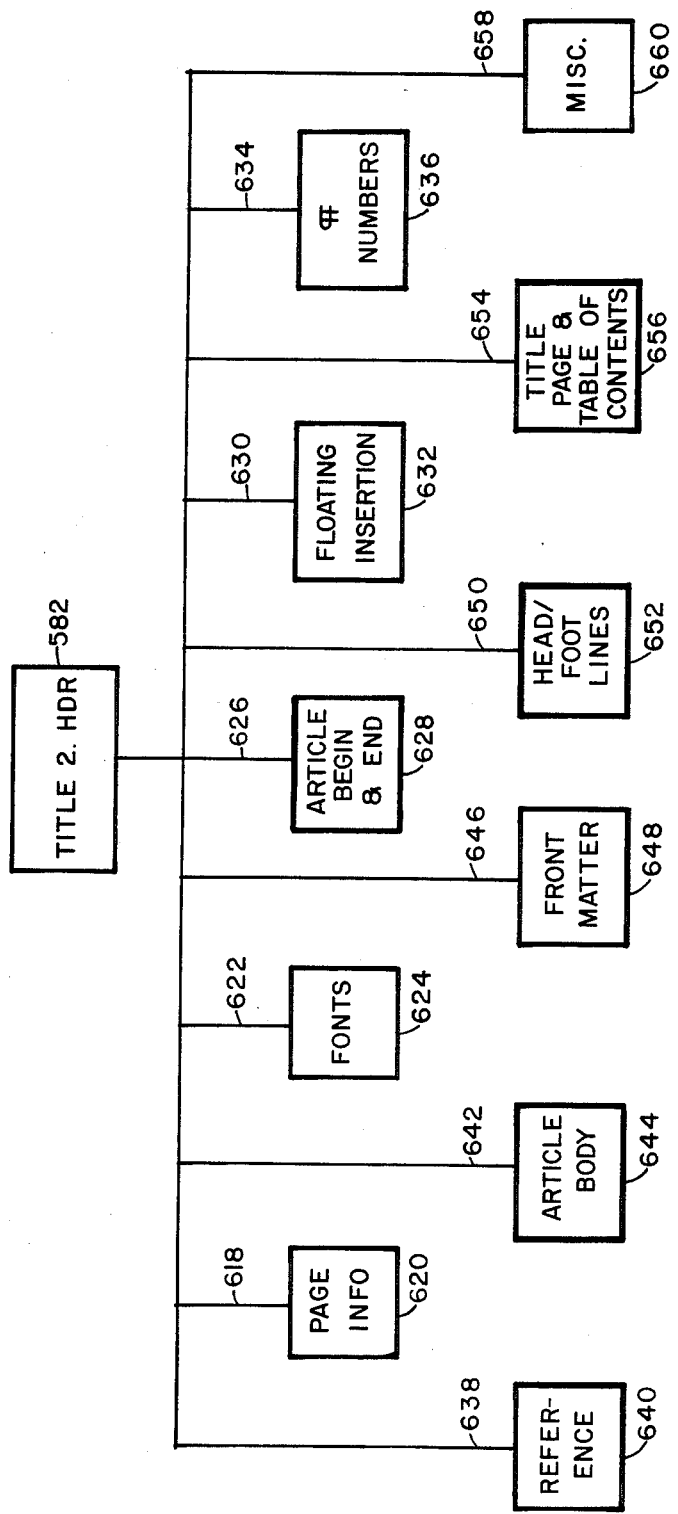
FIG. 6 is an exploded view of the TITLE 2.HDR MACRO.

Looking to FIG. 6, instructional groupings of the TITLE2.HDR MACRO at 582 described in conjunction ith FIG. 5 are revealed. In this regard, the macro is represented by line 618 and block 620 as containing an instructional component labeled "PAGE INFO" which provides instructions as to the horizontal and vertical dimensions of a given page, spacing information, and like formatting. In similar fashion, as represented at line 622 and block 624, the latter being labeled "FONTS," instructions are provided as to header font structures and the definition of fonts used in the heading of a given article. Line 626 is seen to extend to block 628 illustrating the instructions as to information with respect to the "BEGINNING AND ENDING OF AN ARTICLE." Line 630 extending to the instruction represented at block 632 labeled "FLOATING INSERTION" illustrates the instructions for positioining components during the formatting procedure. For example, graphic items must be positioned such that their full extent is included on a single page. Line 634 extending to block 636 is concerned with an instruction as to "PARAGRAPH NUMBER" and extent. In this regard, the instructions look to the anomalies wherein an equation or graphic material may be either at the beginning or end of a paragraph and some form of identification of the extent of the paragraph is required. Additionally, such information as headings and the like normally would be excluded from the definition of the paragraph extent. Line 638 and block 640 illustrate a "REFERENCE" instruction for the positioning of a given reference such as a title or footnote within a given page format. Alternately, end notes may be incorporated in the article as opposed to footnotes and the instructions look to the styling of such notes.

Line 642 and block 644 illustrate instructions concerning the "BODY" of a given article. These instructions look to the hierarachy of headings and sections, i.e. the positioning and selection of sub-headings and sub-paragraphing as may be required. Line 646 and block 648 illustrate the instructions which may be required to consider "FRONT MATTER." These instructions will look, for example, to positioning and spacing of title, source, addition, volume, first page, last page, abstract, author, and any affiliation of the author. Line 650 and block 652 concern instructions for positioning "HEADLINES" as well as "FOOTLINES," while line 564 and block 656 look to the generation of a "TABLE OF CONTENTS" (by paragraph) as well as a "TITLE PAGE" for printing out any given article. Inasmuch as the product of the instant process and system generally will be accessed as a single article, such information will be of considerable value to the user and would not otherwise be provided or available with a simple photocopy of the article. It may be observed that the Table of Contents is particularly useful for monitor viewing as it facilitates jumping to the appropriate passage. Line 658 and block 660 look to "MISCELLANEOUS" instructions including such items as copyright notices, appropriate dates, listings, and boxing of desired portions of the article desired are considered.

Figure 7:
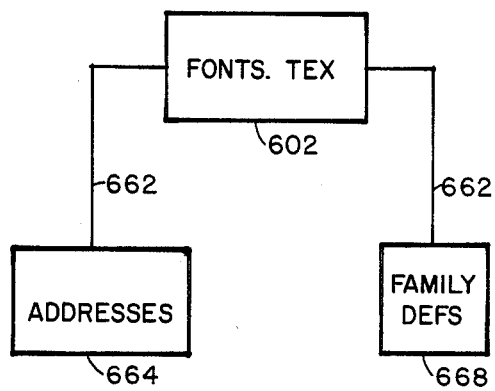
FIG. 7 is an exploded view of the FONTS.TeX MACRO.
Figure 8:
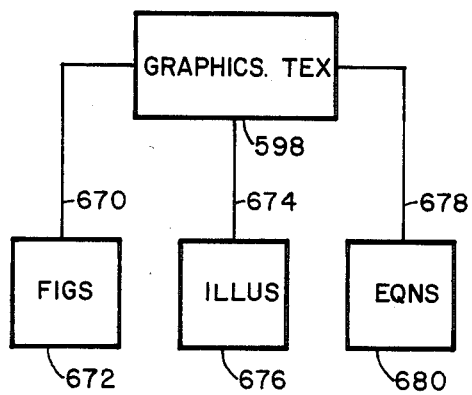
FIG. 8 is an exploded view of the GRAPHICS.TeX MACRO.
Figure 9:
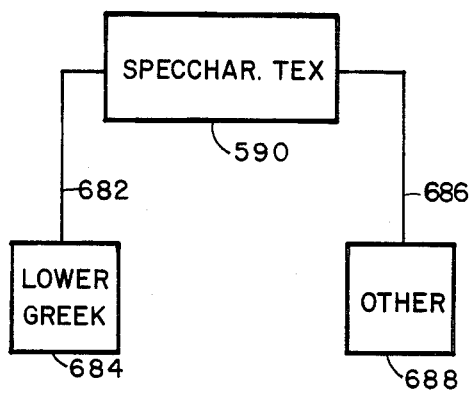
FIG. 9 is an exploded view of the SPECCHAR.TeX MACRO.

The array of MACRO instructions at 570 in FIG. 5 is seen to contain FONTS.TeX, GRAPHICS.TeX, and SPECCHAR.TeX at blocks 602, 598, and 590, respectively. The latter blocks are reproduced at an enchanced level of detail in respective FIGS. 7, 8, and 9. FIG. 7 shows the FONTS.TeX MACRO to include "FONT ADDRESSES" as represented at line 662 and block 664 and "FONT FAMILY DEFINITIONS" as represented at line 666 and block 668. The latter definitions allow the process operators to select the font style and size for each individual portion of a article, e.g. references, body, headings, caption, and the like. FIG. 8 depicts the three instructional groupings of the GRAPHICS.TeX MACRO, namely instructions enabling the differentiation of "FIGURES" as represented at line 670 and block 672, "ILLUSTRATIONS" as represented at line 674 and block 676, and "EQUATIONS" as represented at line 678 and block 680. FIG. 9 reveals instructional groupings of the SPECCHAR.TeX MACRO to include the "LOWER CASE GREEK" alphabet as represented at line 682 and block 684. Additionally, non-greek special character instructions are grouped in a miscellaneous fashion as represented at line 686 and block 688 labelled "OTHER."

Figure 10:
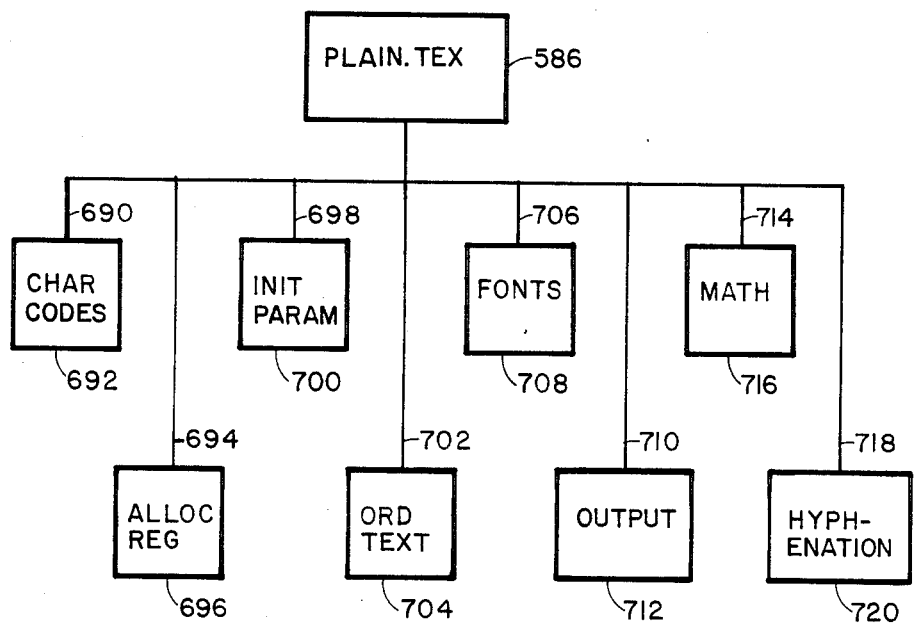
FIG. 10 is an exploded view of the PLAIN.TeX MACRO.

Returning momentarily to FIG. 5 and the array of MACRO instructions contained therein, the PLAIN.TeX MACRO is seen at block 586. This MACRO differs from the other siz in that it was only slightly modified and not generated in toto by the process operators. PLAIN.TeX includes MACRO instructions which come with the TeX program discussed earlier; so that the generated MACRO instructions serve to supplement these originals. FIG. 10 reveals the contents of the PLAIN.TeX MACRO in diagrammatic fashion. Instruction groupings include: "CHARACTER CODES" as represented at line 690 and block 692; "INITIAL PARAMETERS" as represented at line 698 and block 700; "FONTS" as represented at line 706 and block 708, which has been supplemented by the generated MACRO explained earlier in conjunction with FIG. 7; "MATH" as represented at line 714 and block 716 for formatting complex equations; "ALLOCATION OF REGISTERS" for the TeX program run as represented at line 694 and block 696; "ORDINARY TEXT" as represented at line 702 and block 704 for formatting paragraphs; "OUTPUT" as represented at line 710 and block 712 for creation of a device independent formatted page file; and "HYPHENATION" as represented at line 718 and block 720, which was slightly modified to accommodate complex terms.

Figure 11:
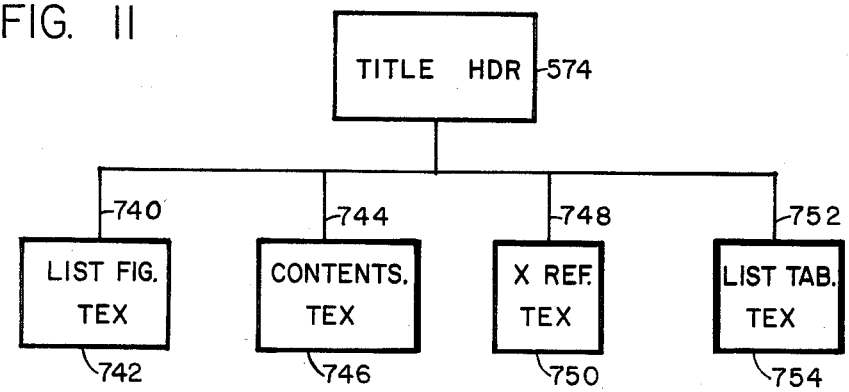
FIG. 11 is an exploded view of the TITLE.HDR MACRO.

The only MACRO not pre-loaded, because it operates at run time, is the TITLE.HDR MACRO represented in FIG. 5 at 574 and reproduced with the same numeration but at an enhanced level of detail in FIG. 11. The TITLE.HDR MACRO creates four files for use by the TeX program in formatting the pages of an article. The "LISTFIG.TeX" file seen at line 740 and block 742 accumulates information as to where all the figures occur in the formatted version for indexing purposes. The "CONTENTS.TeX" file seen at line 744 and block 746 accumulates the paragraph numbers associated with all the headings and subheadings of an article to enable development of a table of contents for every article. The "XREF.TeX" file seen at line 748 and block 750 keeps tracks of graphic callouts within the text to enable floating insertion and indexing. Finally, the "LISTTAB.TeX" file seen at line 752 and block 754 performs a similar function to the XREF.TeX file for typeset tables as opposed to scanned ones.

Figure 12:
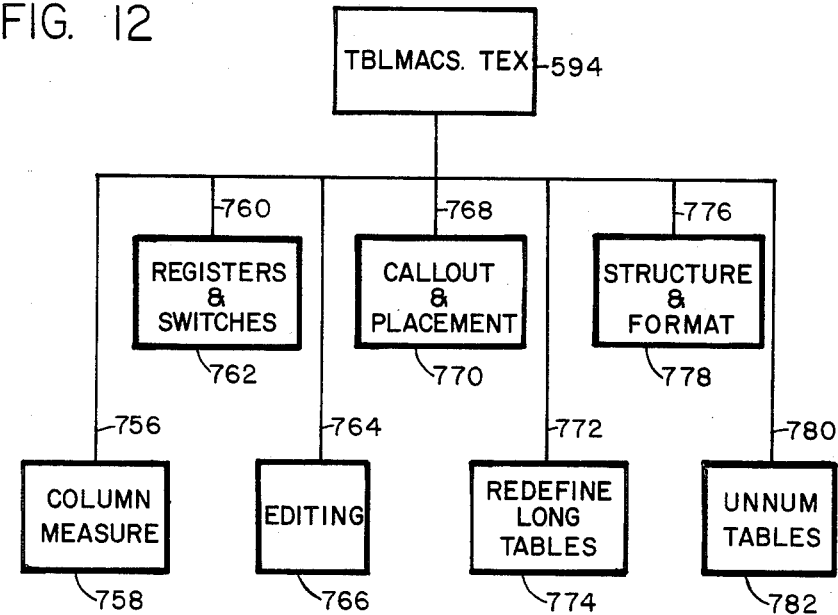
FIG. 12 is an exploded view of the TBLMACS.TeX MACRO.

As discussed earlier in conjunction with FIG. 2B and the pre-TeXing process, tables are fairly troublesome but worthwhile to typeset. Consequently, the TBLMACS.TeX MACRO, seen in FIG. 5 at block 594 and reproduced with the same numeration but at an enhanced level of detail in FIG. 12, was created in order to alleviate some of the difficulty. Instructional groupings of TBLMACS.TeX include: "COLUMN MEASURE" as represented at line 756 and block 758; "REGISTERS AND SWITCHES" as represented at line 760 and block 762; "EDITING" as represented at line 764 and block 766; "CALLOUT AND PLACEMENT" as represented at line 768 and block 770; "REDEFINE LONG TABLES" as represented at line 772 and block 774; "STRUCTURE AND FORMAT" as represented at line 776 and blcok 778; and "UNNUMBERED TABLES" as represented at line 780 and block 782. It may be observed that each of the groupings provide a set of instruction for handling one of any number of special problems arising in attempts to typeset complex tabular data.

Since certain changes may be made in the above system and method without departing from the scope of the invention herein involved, it is intended that all matter contained in the above description or shown in the accompanying drawings still be interpreted as illustrative and not in a limiting sense.

We claim:

1. A system for converting visual illustrations on paper and associated magnetic media retained text and tabulation typesetting data of a printed publication of articles, into universally outputable digital data form retained in master memory, comprising:
   graphics locator means for determining the insertion locations referenced within said text and tabulations typesetting data representing the positioning of said visual illustrations;
   scanning means for converting said visual illustrations to digital graphic data;
   means for generating graphic property data representing the graphics size characteristics of said digital graphic data;
   means for providing font size data for the text characters represented by said text typesetting data;
   means for providing font image defining data;
   formatting means responsive to said insertion location, said text typesetting data, said graphic property data and said font size data for generating device independent formatted page files; and
   mastering means responsive to said digital graphic data, said device independent formatted page files, and said font image defining data for deriving said universally outputable digital data retained within said master memory.

2. The system of claim 1 including:
   means for altering those portions of said text typesetting data not configured with standardized general mark-up language to SGML configured data incorporating standardized general mark-up language; and
   said formatting means is responsive to said SGML configured data as said text typesetting data.

3. The system of claim 1 including:
   article identification means responsive to said text and tabulation typesetting data for assembly of a directory of all files corresponding with each article of said printed publication; and
   said graphics locator means is responsive to said text and tabulations typesetting data and said article identification means directory for determining said insertion locations.

4. The system of claim 1 including:
   tabluation identifier means responsive to said text and tabulations typesetting data for deriving a separate tabulation file corresponding therewith;
   said formatting means is responsive to said tabulation file for deriving a device independent formatted tabulation file; and
   including tabulation readout means responsive to said device independent formatted tabulation file for deriving a visually inspectable tabulation check readout corresponding therewith.

5. The system of claim 1 including:
   equation identifier means responsive to said text and tabulations typesetting data for deriving a separate equation file corresponding therewith;
   said formatting means is responsive to said equation file for deriving a device independent formatted equation file; and
   including equation readout means responsive to said device independent formatted equation file for deriving a visually inspectable equation check readout corresponding therewith.

6. The system of claim 4 including change means responsive to applied corrections derived by visual inspection of said tabulation check readout for correctively effecting alteration of said tabulation file article identification means directly of files.

7. The system of claim 5 including change means responsive to applied corrections derived by visual inspection of said equation check readout for correctively effecting alteration of said equation file.

8. The system of claim 1 including numbering means for numbering each paragraph of each said article.

9. The system of claim 1 including graphics readout means responsive to said graphics locator means insertion locations, said scanning means digital graphic data and said graphic property data for deriving a visually inspectable graphics check readout corresponding therewith.

10. The system of claim 1 including:
tabulation identifier means responsive to said text and tabulations typesetting data for deriving a separate tabulation file corresponding therewith;
said formatting means is responsive to said tabulation file for deriving a device independent formatted tabulation file;
including tabulation readout means responsive to said device independent formatted tabulation file for deriving a visually inspectable tabulation check readout corresponding therewith;
change means responsive to applied corrections derived by visual inspection of said tabulation check readout for correctively effecting alteration of said tabulation file; and
graphics readout means responsive to said graphics locator means insertion locations, said scanning means digital graphic data and said graphic property data for deriving a visually inspectable graphics check readout corresponding therewith.

11. The system of claim 1 including:
equation identifier means responsive to said text and tabulations typesetting data for deriving a separate equation file corresponding therewith;
said formatting means is responsive to said equation file for deriving a device independent formatted equation file;
including equation readout means responsive to said device independent formatted equation file for deriving a visually inspectable equation check readout corresponding therewith;
change means responsive to applied corrections derive by visual inspection of said equation check readout for correctively effecting alteration of said equation file; and
graphics readout means responsive to said graphics locator means insertion locations, said scanning means digital graphic data and said graphic property data for deriving a visually inspectable graphics check readout corresponding therewith.

12. The system of claim 1 including:
indexing means responsive to said text and tabulation typesetting data for deriving a word list corresponding therewith said, indexing means further associating each said word of said word list with a select field associated therewith to provide a unique word list; and
said mastering means being further responsive to said unique word list for retention in said master memory.

13. The system of claim 12 including a comparison means responsive to a stop word list of non-essential words for deriving a refined unique word list.

14. The system of claim 1 including:
article identification means responsive to said text and tabulation typesetting data and said assembly of a directory of files corresponding with each article of said printed publication;
page readout means responsive to said insertion locations, said text typesetting data, said graphics property data, said digital graphic data and said font size data for deriving a visually inspectable page check readout for each page formatted by said formatting means; and
change means responsive to applied corrections derived by visual inspection of said page check readout for effecting alteration of said page formatted by said formatting means.

15. A method for converting the graphic illustrations on paper and associated magnetic media retained text typesetting data from which has been derived a printed assemblage of articles, into device independent digital data form retained in master memory, comprising the steps of:
identifying the insertion locations within said magnetic media retained text typesetting data for each said graphic illustration and generating a corresponding whatgraph file;
scanning each said graphic illustration and deriving digital graphic data corresponding therewith;
generating graphic property data representing the graphics size characteristics of said digital graphic data;
providing font size data;
providing font image defining data;
formatting said text typesetting data, said whatgraph file, said graphic property data, and said font size data to provide device independent formatted page files; and
combining said device independent formatted page files, said font image defining data, and said digital graphic data in magnetic media for retention in said master memory.

16. The method of claim 15 including the step of collecting and identifiying all files from said magnetic media retained text typesetting data corresponding with each said article of said assemblage and deriving therefrom a corresponding directory of said files.

17. The method of claim 15 including the step of assigning identifying numbers to the paragraphs of each said article.

18. The method of claim 15 including the step of altering said text typesetting data to incorporate standardized general mark-up language to provide said text typesetting data as standard SGML data.

19. The method of claim 15 including the steps of:
generating a visual graphic readout from said digital graphic data, said whatgraph file and said graphic property data for each said graphic illustration; and
rescanning said grahic illustration in the event of a defect represented in said visual graphic readout.

20. The method of claim 15 including the steps of:

generating a list of words from said text typesetting data; and combining said word list in said magnetic media for retention as index data in said master memory.

21. The method of claim 20 including the steps of: providing a stop word list of non-essential words; and removing said non-essential words from said list of words to provide a refined word list for retention as indexed data in said master memory.

22. The method of claim 20 including the step of associating each said word of said word list with a select field associated therewith to provide a unique word list for retention as index data in said master memory.

23. The method of claim 21 including the step of associating each said word of said refined word list with a select field associated therewith to provide a unique refined word list for retention as index data in said master memory.

24. The method of claim 15 including the steps of:
generating a page visual readout from said device independent formatted page files, said font image defining data, and said digital graphic data; and
applying corrections to effect alteration of said page visual readout in the event of a defect represented in said page visual readout.

25. The method of claim 15 including steps of:
generating a graphic readout from said digital graphic data, said whatgraph file and said graphic property data for each said graphic illustration;
rescanning said grahic illustration in the event of a defect represented in said visual graphic readout;
generating a page visual readout from said device independent formatted page files, said font image defining data, and said digital graphic data; and
applying corrections to effect alteration of said page visual readout in the event of a defect represented in said page visual readout.

26. A method for treating the graphic illustration on paper and associated computer storage media retained text and tabulation typesetting data from which has been derived a printed assemblage of articles to provide corresponding device independent digital data for retention in master memory, comprising the steps of:
identifying the insertion locations within said magnetic media retained text typesetting data for each said graphic illustration and generating a corresponding whatgraph file;
scanning each said grahic illustration and deriving digital graphic data corresponding therewith;
generating graphic property data representing the graphics size characteristics of said digital graphic data;
formatting said tabulation typesetting data, and said font size data to provide device independent formatted tabulation files;
generating a tabulation visual image from said device independent formatted tabulation files;
applying corrections to said directory of files in the event of a defect represented in said tabulation visual image;
formatting said text typesetting data, said device independent formatted tabulation files, said whatgraph file, said graphic property data and said font size data to provide device independent formatted page files; and
combining said device independent formatted page files, said font image defining data and said digital graphic data in magnetic media for retention in said master memory.

27. The method of claim 26 including step of collecting and identifying all files from said magnetic media retained text and tabulation typesetting data corresponding with each said article of said assemblage and deriving therefrom a corresponding directory of said files.

28. The method of claim 26 including the step of assigning identifying numbers to paragraphs of each said article.

29. The method of claim 26 including the step of altering said tabulation and text typesetting data to incorporate standardized general mark-up language to provide said text typesetting data as standard SGML data and said tabulation typesetting data as table SGML data.

30. The method of claim 26 including the steps of:
generating a visual graphic readout from said digital graphic data, said whatgraph file and said graphic property data for each said graphic illustration; and
rescanning said graphic illustration in the event of a defect represented in said visual graphic readout.

31. The method of claim 26 including the steps of:
generating a list of words from said tabulation and text typesetting data; and
combining said word list in said magnetic media for retention as index data in said master memory.

32. The method of claim 31 including the steps of:
providing a stop word list of non-essential words; and
removing said non-essential words from said list of words to provide a refined word list for retention as index data in said master memory.

33. The method of claim 31 including step of associating each said word of said word list with a select field associated therewith to provide a unique word list for retention as index data in said mater memory.

34. The method of claim 32 including the step of associating each said word of said refined word list with a select field associated therewith to provide a unique refined word list for retention as index data in said master memory.

35. The method of claim 26 including the steps of:
generating a page visual image from said device independent formatted page files, said font image defining data, and said digital graphic data; and
applying corrections to in the event of a defect represented in said page visual image.

36. The method of claim 26 including the steps of:
generating a visual graphic readout from said digital graphic data, said whatgraph file and said graphic property data for each said graphic illustration; and
rescanning said graphic illustration in the event of a defect represented in said visual graphic readout;
generating a page visual image from said device independent formatted page files, said font image defining data, and said digital graphic data; and
applying corrections to effect alteration of said visual image in the event of a defect represented in said page visual image.

37. A method for converting graphic illustrations retained in an associated storage media, and text typesetting data retained in an associated storage media, into device independent digital form retained in master memory, comprising the steps of:
- identifying the insertion locations within said media retained text typesetting data for each said graphic illustration and generating a corresponding whatgraph file;
- generating graphic property data representing the graphics size characteristics of said graphic illustration data;
- providing font size data;
- providing font image defining data;
- formatting said text and tabulation typesetting data, said whatgraph file, said graphic property data, and said font size data to provide device independent formatted page files; and
- combining said device independent formatted page files, said font image defining data, and said graphic data for retention in said master memory.

38. The method of claim 37 including the step of collecting and identifying all files from said media retained text typesetting data corresponding with each said article of said assemblage and deriving therefrom a corresponding directory of said files.

39. The method of claim 37 including the step of assigning identifying numbers to paragraphs of each said article.

40. The method of claim 37 including the step of altering said text typesetting data to incorporate standardized general make-up language to provide said text typesetting data as standard SGML data.

41. The method of claim 37 including the steps of:
- generating a list of words from said text and tabulation typesetting data; and
- combining said word list for retaining as index data in said master memory.

42. The method of claim 41 including the steps of:
- providing the stop word list of non-essential words; and
- removing said non-essential words from said list of words to provide a refined word list for retention as index data in said master memory.

43. The method of claim 41 including the step of associating each said word of said word list with a select field associated therewith to provide a unique word list for retention as index data in said master memory.

44. The method of claim 42 including the step of associating each said word of said refined word list with a select field associated therewith to provide a unique refined word list for retention as index data in said master memory.

45. The method of claim 37 including the steps of:
- generating a page visual readout from said device independent formatted page files, said font image defining data, and said graphic data; and
- applying corrections to effect alteration of said page visual readout in the event of a defect in said page visual readout.

* * * * *